UNITED STATES PATENT OFFICE.

MELCHIOR BÖNIGER, OF BASLE, SWITZERLAND, ASSIGNOR TO CHEMISCHE FABRIK, VORMALS SANDOZ, OF SAME PLACE.

BROWN AZO DYE.

SPECIFICATION forming part of Letters Patent No. 608,024, dated July 26, 1898.

Application filed January 18, 1898. Serial No. 667,074. (Specimens.)

*To all whom it may concern:*

Be it known that I, MELCHIOR BÖNIGER, a citizen of the Swiss Republic, residing at Basle, Switzerland, have invented new and useful Improvements in Brown Azo Dyes, of which the following is a specification.

In the French Brevet d'Invention 243,735, dated December 18, 1894, azo coloring-matters are described which are formed by combination of diazo and tetrazo compounds with the azo compounds derived from diazonaphtholsulfonic acids and metadiamins.

In this patent it has been distinctly stated that one molecule of these monoazo compounds has the property of combining with one molecule of a diazo compound, the new azo group fixing itself in the radical of the metadiamin.

Now I have found that one molecule of the above-mentioned monoazo compounds, especially of those derived from diazotized $beta_1$ $alpha_4$ amidonaphthol $beta_2$ $beta_3$ disulfonic acid (German Letters Patent No. 53,023) and metaphenylendiamin or metatoluylendiamin having the formula

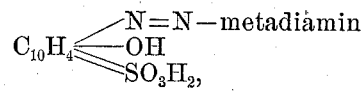

which in future I will call "color A," is susceptible of combining with two molecules of one and the same diazo compound or with one molecule each of two different diazo compounds. By combining the "color A" first with a diazo compound—as, for example, diazonaphthionic acid—and by combining then the thus-obtained diazo color with the intermediate product formed by combination of the tetrazo compound of a paradiamin with one molecule of salicylic acid new polyazo coloring-matters are obtained which dye on cotton dark-brown shades without the use of a mordant. Similar brown dyestuffs, slightly bluer in shade, are obtained by combining first the "color A" with the intermediate product of the tetrazo compound and salicylic acid and causing, finally, the diazo compound—as, for example, diazonaphthionic acid—to act upon the mixed trisazo coloring-matter thus formed.

In carrying out my invention I proceed as follows:

Example I: 34.1 kilos of the acid sodium salt of $beta_1$ $alpha_4$ amidonaphthol $beta_2$ $beta_3$ disulfonic acid are diazotized in the usual manner with 6.9 kilos of sodium nitrite. The diazonaphtholsulfonic acid, suspended in about five hundred liters of water, is combined with a solution of 12.2 kilos of metatoluylendiamin in about four hundred liters of water. After some hours' standing the combination to the "color A" is finished, and the brown precipitate is then dissolved by addition of four kilos of caustic soda and forty-eight kilos of sodium carbonate. After cooling to 10° centigrade 23.400 kilos of diazonaphthionic acid, suspended in about five hundred liters of water, are slowly poured into the solution, which turns its yellow-brown color into dark red brown. The combination being complete after about three hours' standing, the disazo color thus obtained is mixed by stirring continuously with the intermediate product formed from the tetrazo compound of 18.4 kilos of benzidin by combination with fifteen kilos of salicylic acid in seven hundred liters of water, four kilos of caustic soda, and thirty kilos of sodium carbonate. Twelve hours later the temperature of the deep-brown solution is slowly raised to 40° centigrade, maintained for six hours. Then it is boiled off, and the new coloring-matter is precipitated by addition of about five hundred kilos of common salt, filtered, pressed, and dried. It dyes on unmordanted cotton from a bath containing salt and rendered slightly alkaline by addition of sodium carbonate deep-brown shades of good fastness to light and soap. Considerably-faster shades are obtained by treating the dyeings at the boil with two to three per cent. of bichromate of potash or sulfate of copper or mixtures of them.

Example II: The "color A" obtained from 34.1 kilos of diazotized $beta_1$ $alpha_4$ amidonaphthol $beta_2$ $beta_3$ disulfonic acid and 10.8 kilos of metaphenylendiamin is first combined at a temperature not exceeding 15° centigrade with the intermediate product obtained from the tetrazo compound of 21.2 kilos of tolidin, fifteen kilos of salicylic acid, four kilos of caustic soda, and thirty kilos of sodium carbonate. After twelve hours 18.4 kilos or paradiazobenzenesulfonic acid diluted with about three hundred liters of water are poured into the mixed trisazo coloring-matter, and this mixture is stirred well during some hours. The trisazo coloring-matter, which was at first almost entirely precipitated as a dark-brown powder, enters through the combination with the paradiazobenzenesulfonic acid in solution, and the new polyazo color formed in this way is precipitated at the boil by addition of about five hundred kilos of common salt, then filtered, pressed, and dried. It dyes on unmordanted cotton a good brown of yellowish shade.

The diazo compound of naphthionic acid or para-amidobenzenesulfonic acid, as described in Examples I and II, can be replaced by equivalent weights of the diazo compounds of the following products: alpha or beta naphthylamin, alpha or beta naphthylamin-monosulfonic acids, amidobenzene or amidotoluene monosulfonic acids, amidobenzene-carbonic acids, nitroanilin, and nitrotoluidin.

Finally it may be stated that in each of the described examples benzidin may be replaced by tolidin and metaphenylendiamin by metatoluylendiamin.

The new coloring-matters thus obtained are in form of a brown-black powder, sparingly soluble in ethylic alcohol, whereas they are easily soluble in hot water, giving a brown solution, which turns in intense red brown by addition of caustic soda. They dissolve in strong sulfuric acid with blue-violet color, giving a bluish-brown precipitate on addition of water, and dye on unmordanted cotton shades varying from yellow brown to blue brown in a salt-bath rendered weakly alkaline.

Having thus described my invention, what I claim, and desire to secure by Letters Patent, is—

1. The process of producing substantive brown polyazo coloring-matters, which consists in combining first one molecule of the azo color $beta_1$ azo $alpha_4$ naphthol $beta_2$ $beta_3$ disulfonic acid metaphenylen or metatoluylen diamin with one molecule of a diazo compound and combining the disazo color thus obtained with one molecule of the intermediate product obtained by combination of one molecule of tetrazo-diphenyl or tetrazo-ditolyl with one molecule of salicylic acid, substantially as hereinbefore described.

2. The process of producing substantive brown polyazo coloring-matters, which consists in combining first one molecule of the azo color $beta_1$ azo $alpha_4$ naphthol $beta_2$ $beta_3$ disulfonic acid metaphenylen or metatoluylen diamin with one molecule of the intermediate product, obtained by combination of one molecule of tetrazo-diphenyl or tetrazo-ditolyl with one molecule of salicylic acid and finally causing one molecule of a diazo compound to act upon the thus-resulting mixed trisazo dyestuffs, substantially as hereinbefore described.

3. As a new article of manufacture the new polyazo coloring-matters derived from beta-azo-alpha-naphthol $beta_2$ $beta_3$ disulfo-metaphenylendiamin as described, the said dyestuffs forming a brown-black powder, sparingly soluble in ethylic alcohol, easily soluble in hot water with brown color, turning in intense red brown on addition of caustic soda, soluble in concentrated sulfuric acid with blue-violet color, giving a bluish-brown precipitate on addition of water and dyeing unmordanted cotton in yellow-brown to blue-brown tints.

In testimony whereof I have signed my name to this specification in the presence of two subscribing witnesses.

MELCHIOR BÖNIGER.

Witnesses:
GEORGE GIFFORD,
ALFRED NAPFLE.